UNITED STATES PATENT OFFICE.

THEODORE NADEAU, OF LEBANON, NEW HAMPSHIRE.

PUTTY.

No. 824,736.     Specification of Letters Patent.     Patented July 3, 1906.

Application filed February 9, 1906. Serial No. 300,276.

*To all whom it may concern:*

Be it known that I, THEODORE NADEAU, a citizen of the United States, residing at Lebanon, in the county of Grafton and State of New Hampshire, have invented certain new and useful Improvements in Putty, of which the following is a specification.

The object of my invention is to produce a new composition of putty which shall be cheap of manufacture, simple in composition, and efficient in use.

My new putty has the following advantages and features, to wit: It is clear and clean, very pliable and elastic, has a high color, and is glossy and smooth in appearance when it has hardened and set, it will not crack, break, peel, or crumble, and is not liable to deteriorate by exposure to the elements.

My new putty is composed of mineral clay, particularly of that specific mineral clay known as "kaolin" and "cotton-seed oil."

In producing my new putty I take kaolin and grind the same in a suitable grinding-machine to a fine powder or reduce the mineral clay in any other suitable manner. I then take a stated quantity of this finely ground and divided kaolin and add thereto a sufficient quantity of cotton-seed oil—say in the proportion of eighty-five per cent. of the powdered kaolin to fifteen per cent. of the oil. Kaolin being naturally of an oily nature will with a small quantity of oil readily produce putty of the proper character and consistency. The kaolin and oil are mixed in any desired manner in a mixing device or machine, the resultant being a putty of high degree in appearance, color, pliability, elasticity, hardening quality, and one which will not break, crack, crumble, or peel and not subject to deterioration from age and exposure to the elements.

While I prefer to use the kaolin and the oil in the proportions herein set forth, I do not limit myself thereto, but may vary the same in the manufacture of the putty.

What I claim as new and of my invention, and desire to secure by Letters Patent, is—

As a new article of manufacture, the herein-described putty composition, consisting of kaolin and cotton-seed oil in the proportions herein set forth, as and for the purposes set forth.

In testimony whereof I affix my signature in presence of two witnesses.

THEODORE NADEAU.

Witnesses:
   JNO. W. STREHLI,
   KATIE STREHLI.